INVENTOR.
ALVIN R. EARNSHAW

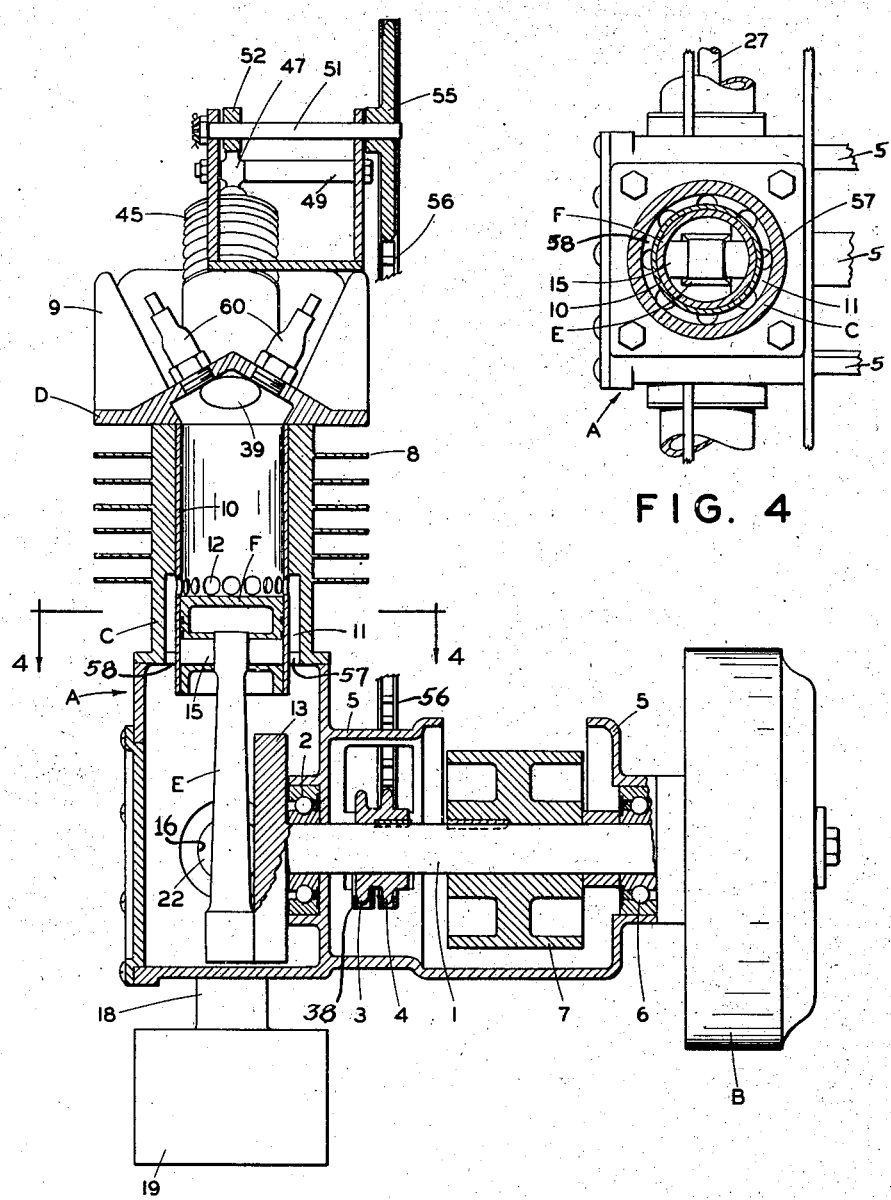

Patented Oct. 14, 1947

2,428,791

UNITED STATES PATENT OFFICE 2,428,791

ENGINE

Alvin R. Earnshaw, Oildale, Calif.

Application September 21, 1945, Serial No. 617,819

4 Claims. (Cl. 123—73)

An object of my invention is to provide an engine of the two-cycle type which has two intake valves and two exhaust valves with mechanical control for all of the valves so that the intake valves will alternate with each other in permitting gas to be drawn into the engine, and the exhaust valves will alternate with each other to permit the burnt gases to exhaust from the engine. By this I mean that during one intake stroke, one intake valve will open and during the following intake stroke the other intake valve will open. In like manner, during one exhaust stroke, one exhaust valve will open and during the next exhaust stroke, the other exhaust valve will open.

An arrangement of this kind permits the engine shaft to rotate at a high speed and the intake and exhaust valves to operate at half the speed. There will therefore be less likelihood for the valves to "float" at high engine speed, because more time will be given for each valve to close than is possible to give where only one intake and one exhaust valve is provided for each cylinder.

In the drawings I have shown only one cylinder although it is obvious that as many cylinders as desired may be connected to the same crank shaft.

A further object of my invention is to provide a device of the type described in which the gas passages between the crank case and the top of the cylinder are arranged so that the firing stroke of the piston will compress the new charge in the crank case and then when the piston completes its power stroke, the passages between the crank case and the cylinder will open and will permit the compressed gas to be forced into the cylinder top. The piston acts as its own valve for opening and closing the intake ports in the cylinder wall. The present engine has been designed for use in connection with providing a prime mover for a bicycle. This particular adaptation is shown in my co-pending application, Serial No. 645,329, filed Feb. 4, 1946. The engine can be used for any other purpose.

Other objects and advantages will appear in the following specification, and the novel features of the device will be particularly pointed out in the appended claims.

My invention is illustrated in the accompanying drawings forming a part of this application, in which:

Figure 3 is a longitudinal section taken substantially along the line 3—3 of Figure 2, and Figure 4 is a horizontal section taken along the line 4—4 of Figure 3.

While I have shown only the preferred forms of my invention, it should be understood that various changes or modifications may be made within the scope of the appended claims without departing from the spirit and scope of the invention.

Figure 1:
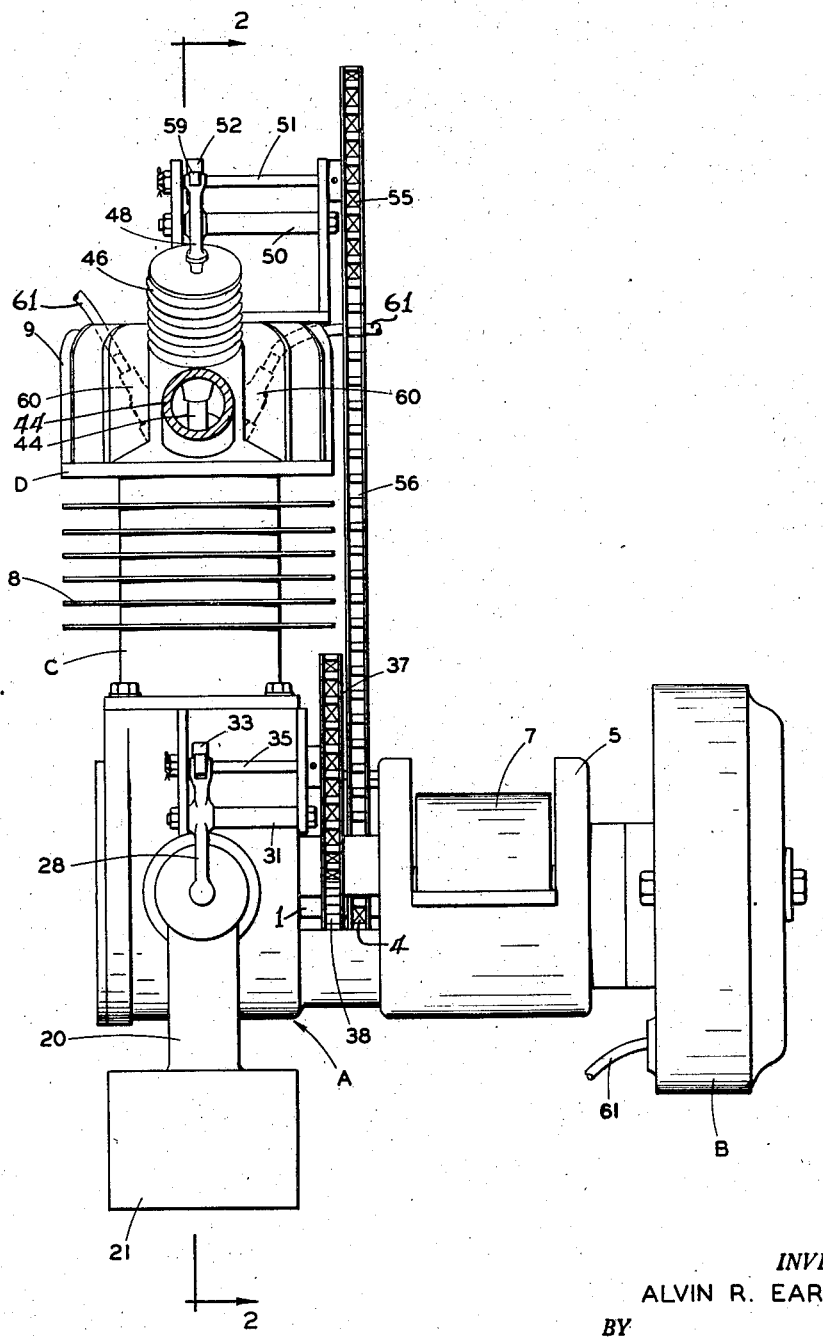
Figure 1 is a side elevation of the engine.
Figure 2:
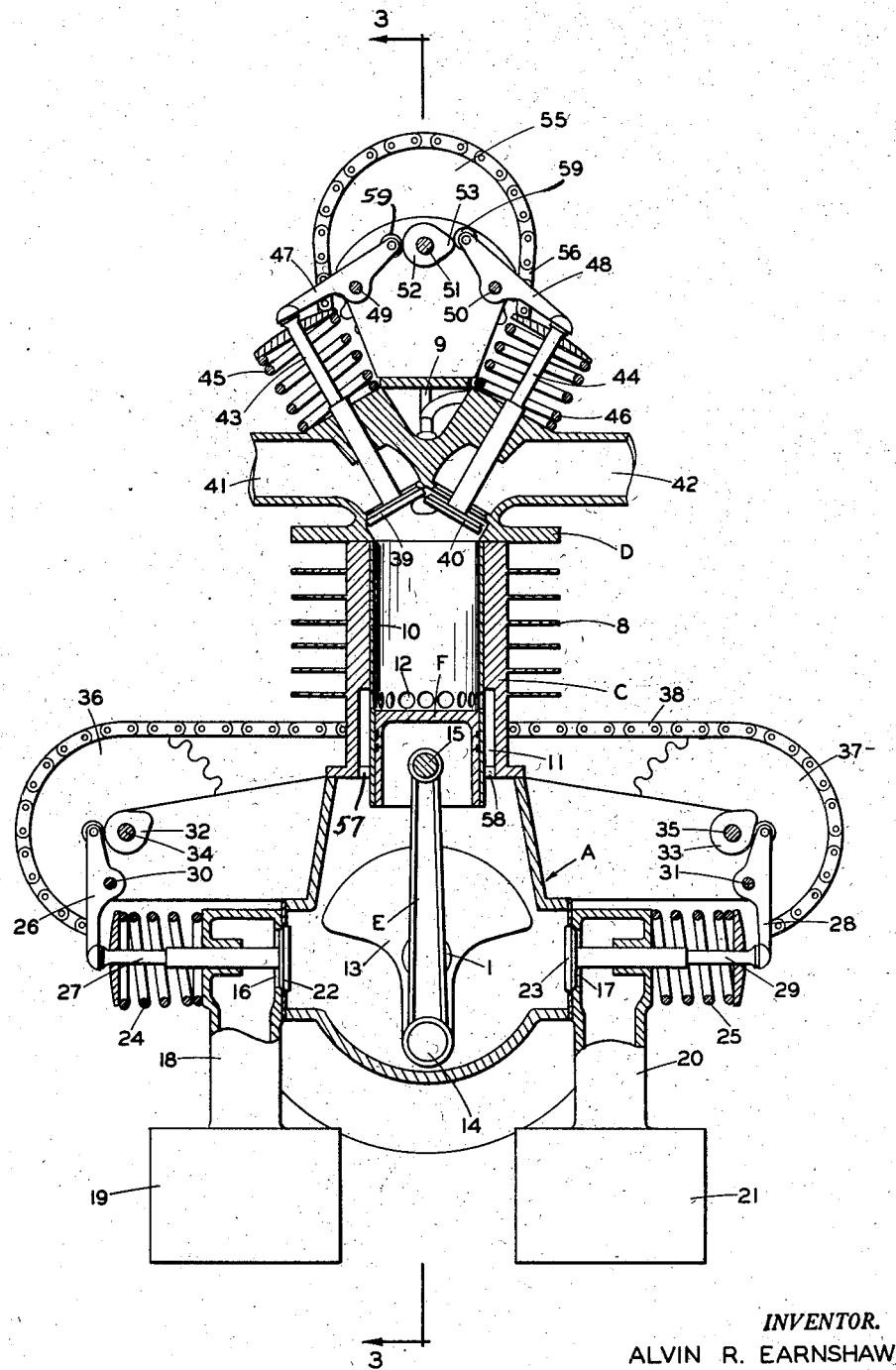
Figure 2 is a transverse section taken along the line 2—2 of Figure 1.

In carrying out my invention, I provide a crank case indicated generally at A in Figures 2 and 3. A crank shaft 1 extends into the crank case and is rotatably supported in a ball bearing 2 or other suitable bearing. In the present form of the device the crank shaft 1 has a pair of sprockets 3 and 4 keyed thereto, see Figure 3, and these sprockets are protected by a casing 5 which is integral with the crank case A. The casing 5 has a portion extending beyond the sprockets and this portion carries another ball bearing 6 or other suitable type of bearing for rotatably supporting the outer end of the crank shaft 1. A pulley 7 is keyed to the crank shaft 1 and this pulley may be connected to any mechanism that is to be driven. It is obvious that the pulley may be changed for a sprocket or a gear if desired. A magneto assembly B is shown mounted at the outer end of the casing 5 and the crank shaft 1 extends into the housing for actuating the magneto in the usual way.

An engine cylinder C is mounted on the crank case A and has ring-shaped cooling fins 8. The engine may be cooled in any manner desired, such as by water, not shown. A cylinder head D is placed on the top of the cylinder and is secured thereto in the usual manner. The cylinder head has radially extending cooling fins 9. The cylinder C has a liner 10 that extends throughout the length of the bore in the cylinder. Figure 3 shows the lower portion of the cylinder as provided with an annular passage 11 that communicates with the interior of the crank case A through a plurality of openings 57 provided in an inwardly extending flange 58. The liner 10 has an annular row of openings 12 that place the interior of the cylinder in communication with the annular passage 11 when the openings are uncovered by a piston.

Figure 2 shows the crank shaft 1 carrying a counterweighted crank arm 13 and the crank arm has a connecting rod E pivotally secured thereto at 14. The piston F is slidably mounted in the liner 10 and is pivotally connected to the crank arm E by the usual wrist pin 15. A rotation of the crank shaft 1 will cause the piston to reciprocate within the liner. The openings 12 in the liner are arranged to be uncovered by the top of the piston when it reaches its lowermost position in the cylinder.

Referring to Figure 2, it will be seen that the crank case A has two intake ports 16 and 17. The intake port 16 communicates with an intake manifold 18 that in turn connects with a carburetor indicated generally at 19. In like manner the intake port 17 communicates with an intake manifold 20 that in turn communicates with a carburetor 21. If desired the two intake manifolds 18 and 20 may be combined into one and communicate with a single carburetor which may be of the down draft type.

Figure 2 also shows the intake ports 16 and 17 controlled by intake valves 22 and 23, respectively. The intake valve 22 is yieldingly held in closed position by a valve spring 24 while the intake valve 23 is yieldingly held in closed position by a valve spring 25. A rocker arm 26 bears against the top of the valve stem 27 for the valve 22 while a rocker arm 28 bears against the top of the valve stem 29 of the intake 23. The rocker arms 26 and 28 are pivotally mounted at 30 and 31, respectively.

I show cams 32 and 33 mounted on cam shafts 34 and 35, see Figure 2, and the cam shafts are rotated by sprockets 36 and 37, which in turn are rotated by a sprocket chain 38 that is passed around these sprockets and around the sprocket 3, mounted on the crankshaft 1. The ratio of the sprocket 3 to the sprockets 36 and 37 is one to two, so that the cam shafts 34 and 35 will be rotated at one-half the speed of the crankshaft 1. The high points of the cams 32 and 33 are arranged so that during the intake stroke of the piston F, one intake valve will open and during the next intake stroke of the piston, the other intake valve will open. This will be explained more in detail hereinafter.

I also provide two exhaust valves for the cylinder C and these are shown at 39 and 40 in Figure 2. The exhaust valve 39 controls the exhaust port 41 while the exhaust valve 40 controls the exhaust port 42. Each exhaust valve 39 and 40 is provided with a valve stem 43 and 44, respectively, and valve springs 45 and 46, yieldingly hold the exhaust valve in closed position. Rocker arms 47 and 48 pivoted at 49 and 50 bear against the ends of the valve stems 43 and 44 and open the exhaust valves at the proper time.

A cam shaft 51 has a cam 52 with a high point 53 that is designed to alternately contact the rocker arms 47 and 48 for every 180° of travel. Should the rocker arms be arranged differently, the cam 52 could have two high points, one for each rocker arm. The exhaust valves 39 and 40 will be alternately opened and in proper sequence. During the exhausting of the burnt gas from the cylinder, one exhaust valve 39 will open at one time and the other exhaust valve will open for the next time.

The cam shaft 51 is shown in Figure 3 as carrying a sprocket 55, which is keyed thereto. A sprocket chain 56 is passed around the sprocket 55 and around the sprocket 4. The ratio of the sprockets 4 and 55 is such as to cause the cam shaft 51 to rotate at one-half the speed of the crankshaft 1.

From the foregoing description of the various parts of the device, the operation thereof may be readily understood.

Figure 2 shows the exhaust valve 40 open and the piston F ready to start its combined exhaust and compression stroke. As soon as the piston reaches bottom dead center, the compressed charge in the crankcase A will pass up through the recesses 57, see Figure 4, that are formed in the flange 58, see Figure 2, this flange being integral with the cylinder C and extending inwardly so as to contact with the portion of the liner 10 that is disposed adjacent to the lower end of the cylinder. The compressed gas then flows through the annular passage 11, through the openings 12, and into the combustion chamber of the cylinder. The incoming gas will force the exhaust gases past the open exhaust valve 40 and into the exhaust pipe 42. The valve 40 is timed so that the cam 52 will move the cam high point 53 past the rocker roller 59 and permit the spring 46 to close the valve and to swing the rocker arm. The exhaust valve 40 opens at 65 degrees before bottom dead center and closes at 55 to 58 degrees past bottom dead center.

The closing of the valve 40 traps the compressed gas within the cylinder and the upwardly moving piston compresses the gas still further. In Figure 3 I show two spark plugs 60 and these spark plugs are electrically connected by a wire 61 to the magneto B. Both spark plugs will be fired by the magneto at the proper time and will ignite the compressed gas within the cylinder. I have found that when the pivot point 14 of the connecting rod E reaches 30 degrees before top dead center, the spark plugs should fire. The piston will then move into its power stroke and the gas ignited by the firing of the dual spark plugs will expand and will drive the piston downwardly.

The intake valve 23 will open after the pivot point 14 of the connecting rod E reaches 35 degrees past bottom dead center. The upwardly moving piston F will suck the new charge past the open valve 23 and into the crank case A. The intake valve 23 will close when the pivot point 14 reaches about 35 degrees past top dead center. The downward moving piston on its power stroke will compress the trapped gas within the crankcase so that this gas will start to flow through the openings 12 as soon as they are uncovered by the piston. It will be seen that the engine works on the two cycle principle and thus far only the exhaust valve 40 and the intake valve 23 has functioned.

During the next upward movement of the piston F, the exhaust valve 39 will open and so will likewise the intake valve 22. The exhaust valve 39 will open 65 degrees before bottom dead center of the pivot point 14 is reached and will close when the pivot point is 55 to 58 degrees past bottom dead center. The intake valve 22 will open 35 degrees after bottom dead center is passed by the pivot point 14 and will close when the pivot point passes 35 degrees beyond top dead center. The dual spark plugs will fire when the pivot point 14 reaches 30 degrees before top dead center. The intake valve 23 and exhaust valve 40 will function for one cycle of operation and the intake valve 22 and exhaust valve 39 will function for the next cycle of operation. This alternate opening of the intake and exhaust valves permits the engine to run at a high speed and the valves to open and close in much the same manner as a four-cycle engine. The engine can deliver a far greater power due to this arrangement, because the valves will have sufficient time in which to close and therefore the valves will have less tendency to float when the engine reaches a high speed.

I claim:

1. In a two cycle engine, a cylinder having an exhaust opening and inlet openings in the cylinder wall, a crankcase having two inlet openings, means placing the interior of the crankcase in communication with the cylinder inlet openings, a piston reciprocably mounted in the cylinder and uncovering the cylinder inlet openings when the piston nears the completion of its power stroke, a crankshaft operatively connected to the piston, a controlled exhaust valve for the exhaust opening, an inlet valve for each crankcase inlet opening, and means interconnecting the inlet valves with the crankshaft for causing them to alternately open for successive intakes during the successive scavenging-compression strokes of the piston, whereby each intake valve will open one half the number of times it would normally be required to open if only one intake valve and opening were provided in the crankcase.

2. In a two cycle engine, a crankcase, a cylinder secured to the crankcase, a liner for the cylinder having inlet openings, said cylinder having an annular passage communicating with the openings and having an inwardly extending flange at the end nearest the crankcase, the flange forming a wall for the annular passage and contacting with the liner for aiding in supporting it, said flange having recesses forming passageways between the annular passage and the crankcase.

3. In a two cycle engine, a crankcase having two inlet ports, a cylinder carried by the crankcase and having two exhaust ports in the top and inlet openings in its wall communicating with the interior of the crankcase, a piston reciprocably mounted in the cylinder and uncovering the inlet openings as the piston nears the completion of its power stroke, a crankshaft operatively connected to the piston, inlet and exhaust valves for the inlet and exhaust ports, and means interconnecting the inlet and exhaust valves with the crankshaft for causing the inlet valves to take turns during successive intake strokes of the piston and the exhaust valves to take turns during successive exhaust strokes of the piston, whereby the inlet and exhaust valves will open and close at one-half the speed they would normally require if only one inlet and one exhaust valve were provided.

4. In a two cycle engine, a crankcase having inlet ports, a cylinder carried by the crankcase and having two exhaust ports in the top and inlet openings in its wall communicating with the interior of the crankcase, a piston reciprocably mounted in the cylinder and uncovering the inlet openings as the piston nears the completion of its power stroke, a crankshaft operatively connected to the piston, inlet and exhaust valves for the inlet and exhaust ports, and means interconnecting the inlet and exhaust valves with the crankshaft for causing the inlet valves to take turns during successive intake strokes of the piston and the exhaust valves to take turns during successive exhaust strokes of the piston, whereby the inlet and exhaust valves will open and close at one-half the speed they would normally require if only one inlet and one exhaust valve were provided, said means comprising a pair of sprockets mounted on the crankshaft, rocker arms for the intake and exhaust valves, cams for actuating the rocker arms, sprockets connected to the cams that operate the intake valve rocker arms and being connected by a sprocket chain to one of said first-named sprockets, and a cam for actuating the rocker arms at the exhaust valves and being operated by a sprocket which is connected by a chain to the other side of the first named pair of sprockets.

ALVIN R. EARNSHAW.

REFERENCES CITED

The following references are of record in the file of this patent:

UNITED STATES PATENTS

| Number | Name | Date |
| --- | --- | --- |
| 1,306,198 | Stanley | June 10, 1919 |
| 876,880 | Johnson | Jan. 14, 1908 |
| 1,423,365 | Smith | July 18, 1922 |
| 1,445,319 | Jelbart | Feb. 13, 1923 |
| 1,289,498 | McHarry | Dec. 31, 1918 |
| 1,366,448 | Erickson | Jan. 25, 1921 |